(12) United States Patent
Czuppon

(10) Patent No.: US 6,171,570 B1
(45) Date of Patent: Jan. 9, 2001

(54) ISOTHERMAL AMMONIA CONVERTER

(75) Inventor: Thomas A. Czuppon, Houston, TX (US)

(73) Assignee: Kellogg Brown & Root, Inc., Houston, TX (US)

(*) Notice: Under 35 U.S.C. 154(b), the term of this patent shall be extended for 0 days.

(21) Appl. No.: 09/169,874

(22) Filed: Oct. 12, 1998

(51) Int. Cl.$^7$ ................................................ C01C 1/04
(52) U.S. Cl. ........................ 423/359; 422/148; 423/360
(58) Field of Search .................................. 423/359, 362, 423/360; 422/148

(56) References Cited

U.S. PATENT DOCUMENTS

| | | |
|---|---|---|
| 2,046,478 * | 7/1936 | O'Leary ................................ 422/148 |
| 2,089,038 * | 8/1937 | Pyzel ..................................... 422/148 |
| 4,055,628 | 10/1977 | McCarroll et al. . |
| 4,122,040 | 10/1978 | McCarroll et al. . |
| 4,163,775 * | 8/1979 | Foster et al. ......................... 423/362 |
| 4,213,954 * | 7/1980 | Pinto ..................................... 422/148 |
| 4,230,669 | 10/1980 | Eagle et al. . |
| 4,568,530 | 2/1986 | Mandelik et al. . |
| 4,568,531 | 2/1986 | van Dijk et al. . |
| 4,594,227 * | 6/1986 | Ohsaki et al. ........................ 423/359 |
| 4,696,799 | 9/1987 | Noe . |
| 4,735,780 | 4/1988 | Noe . |
| 5,250,270 | 10/1993 | Noe . |

* cited by examiner

Primary Examiner—Wayne Langel
(74) Attorney, Agent, or Firm—Kellogg Brown & Root, Inc.

(57) ABSTRACT

A vertical tubular reactor for converting ammonia synthesis loop purge gas to ammonia; a method for converting ammonia synthesis loop purge gas to form additional ammonia; and a method for retrofitting a conventional ammonia plant having a synthesis loop using an iron-based synthesis catalyst and having a purge gas stream, the method including a supplemental ammonia converter for the purge gas stream. The supplemental ammonia converter is a shell and tube reactor. The tubes are filled with a catalyst comprising a platinum group metal such as ruthenium. The tubes are maintained in a substantially isothermal condition by boiling water in the shell side. As a retrofit modification to an existing ammonia synthesis plant, the purge stream is passed through the supplemental ammonia converter on a once-through basis to form additional ammonia and reduce the amount of purge gas. Advantages of the retrofit modification include lower energy consumption, lower purge rates and higher ammonia production rates.

16 Claims, 2 Drawing Sheets

ISOTHERMAL AMMONIA CONVERTER

FIELD OF THE INVENTION

This invention relates to an isothermal ammonia converter, and more particularly to an ammonia converter and method for converting ammonia synthesis loop purge gas containing nitrogen and hydrogen to form additional ammonia.

BACKGROUND OF THE INVENTION

Ammonia is commonly manufactured by reacting nitrogen and hydrogen in a synthesis loop including a compressor, an ammonia synthesis reactor and ammonia condensation and recovery. The unreacted synthesis gas mixture is typically recycled from the ammonia separator to the compressor and back to the reactor. Make-up synthesis gas is continuously added to the synthesis loop to provide fresh hydrogen and nitrogen. Because the synthesis gas contains argon, methane and other inert components, a purge stream is usually taken from the synthesis loop to avoid the excessive buildup of the inerts in the synthesis loop. The purge gas is typically processed in a hydrogen recovery unit, and a hydrogen-enriched stream is recycled to the synthesis loop. In some cases, the purge gas is used directly in the fuel system with or without any additional treatment or hydrogen recovery.

A significant technological advance in the manufacture of ammonia has been the use of a highly active synthesis catalyst comprising a platinum group metal such as ruthenium on a graphite-containing support as described in U.S. Pat. Nos. 4,055,628; 4,122,040; and 4,163,775; all of which are hereby incorporated herein by reference. Also, reactors have been designed to use this more active catalyst, particularly the catalytic reactor bed disclosed in U.S. Pat. No. 5,250,270 which is hereby incorporated herein by reference. Other ammonia synthesis reactors include those disclosed in U.S. Pat. Nos. 4,230,669; 4,696,799; and 4,735,780; and the like.

Ammonia synthesis schemes have also been developed based on the highly active catalyst. In U.S. Pat. No. 4,568,530, stoichiometrically hydrogen-lean synthesis gas is reacted in a synthesis reactor containing the highly active catalyst in the synthesis loop.

In U.S. Pat. No. 4,568,532, an ammonia synthesis reactor based on the highly active catalyst is installed in series in the synthesis loop downstream from a reactor containing the more conventional iron-based synthesis catalyst.

In U.S. Pat. No. 4,568,531, the purge gas removed from the primary synthesis loop is introduced into a second synthesis loop using the more active synthesis catalyst to produce additional ammonia from the purge stream. Another purge stream, significantly reduced in size, is taken from the second synthesis loop to avoid the excessive buildup of inerts. The second synthesis loop, like the primary synthesis loop, employs a recycle compressor to recycle synthesis gas to the active catalyst converters in the second synthesis loop.

It would be very desirable to convert hydrogen and nitrogen in the purge stream from a conventional ammonia synthesis loop into additional ammonia using a once-through reactor which does not require staged cooling and a synthesis gas recycle compressor.

SUMMARY OF THE INVENTION

The present invention is directed to an ammonia converter which can be used to convert ammonia synthesis loop purge gas containing nitrogen and hydrogen to form additional ammonia. The ammonia converter is a shell-and-tube reactor using a platinum group metal ammonia synthesis catalyst in the tubes which are maintained in essentially an isothermal condition by boiling water or another heat transfer fluid on the shell side. The ammonia converter allows the ammonia synthesis process to produce additional ammonia from the synthesis loop purge gas by passing the purge gas through the isothermal ammonia converter. The ammonia converter can be installed as a retrofit modification of an existing ammonia synthesis plant to pass the purge stream or a combination of purge streams from several plants through the isothermal ammonia converter on a once-through basis to form additional ammonia, and reduce the size of the purge gas stream which is either processed further in a hydrogen recovery unit or sent to the fuel system directly.

In one aspect, then, the present invention provides an ammonia converter for converting ammonia synthesis loop purge gas containing nitrogen and hydrogen to form additional ammonia. The ammonia converter is a shell and tube reactor having upright tubes. A source of feed gas contains nitrogen and hydrogen for supply to an inlet of the tubes. Ammonia synthesis catalyst in the tubes is adapted to convert the nitrogen and hydrogen to ammonia as the gas passes through the tubes. A source of saturated boiler feed water supplies boiling water to a shell-side of the reactor to maintain a substantially isothermal shell-side condition and remove heat from the tubes. A tube-side outlet is provided for recovering product gas having an increased ammonia content relative to the feed gas. The catalyst preferably comprises a platinum group metal such as ruthenium supported on graphite. The tubes are preferably sized for containing a catalyst volume, and present an area for heat transfer to the boiling water, to maintain the feed and product gases at a temperature in the range from 315° C. to 435° C. at a reaction pressure from 60 to 210 bar. The pressure of the shell-side boiling water is preferably from 60 to 150 bar. The feed gas preferably comprises synthesis loop purge gas having an ammonia content less than 4 mole percent, and the product gas preferably has an ammonia content from about 15 to about 40 mole percent. The converter can further include an ammonia separator for removing ammonia from the product gas to form an ammonia-lean stream, a hydrogen recovery unit for removing hydrogen from the ammonia-lean stream to form a nitrogen-rich stream, and a compressor for recycling a portion of the nitrogen-rich stream to the feed gas source.

In another aspect, the present invention provides a method for converting ammonia synthesis loop purge gas containing nitrogen and hydrogen to form additional ammonia. The method includes the steps of supplying the synthesis loop purge gas to the inlet of the tubes of the shell and tube reactor of the ammonia converter described above, operating the ammonia converter, and recovering ammonia from the product gas to form an ammonia-lean stream. The method can also include the step of preheating the synthesis purge gas in heat exchange with the product gas. The ammonia recovery step preferably includes cooling the product gas to condense ammonia and separating the liquid ammonia from the ammonia-lean stream. The method can also include the steps of supplying the ammonia-lean stream to a hydrogen recovery unit to form a nitrogen-rich stream and a hydrogen-rich stream, compressing a portion of the nitrogen-rich stream and recycling the compressed nitrogen-rich stream into the preheated synthesis loop purge gas, and recycling the hydrogen-rich stream to the synthesis loop.

In a further aspect of the invention, there is provided a method for retrofitting an ammonia plant having a synthesis loop and a purge gas loop. The retrofit method is particularly applicable to retrofitting an ammonia plant wherein fresh ammonia synthesis gas containing hydrogen and nitrogen is combined in the synthesis loop with first and second recycle streams to form a combined ammonia synthesis gas, the combined ammonia synthesis gas is reacted over ammonia synthesis catalyst to form a converted gas, and a purge gas stream and ammonia are removed from the converted gas to form the first recycle stream; and wherein the purge gas stream is processed in a hydrogen recovery unit to form a nitrogen-rich stream and a hydrogen-rich stream which is supplied to the synthesis loop as the second recycle stream. The retrofit method includes installing a shell and tube reactor having upright tubes containing ammonia synthesis catalyst for once-through conversion of nitrogen and hydrogen in a purge gas feed stream, including the purge gas stream from the synthesis loop, into additional ammonia in a reactor effluent stream. Boiler feed water is supplied to a shell side of the reactor to remove heat from the tubes and maintain a substantially isothermal condition on the shell side. Heat exchangers and a vapor-liquid separator are installed for condensing and recovering ammonia from the reactor effluent stream and forming an ammonia-lean stream. The ammonia-lean stream is passed to the hydrogen recovery unit.

The retrofit method can also include installing a compressor for combining a portion of the nitrogen-rich stream from the hydrogen recovery unit with the purge gas stream from the synthesis loop to form the purge gas feed stream. The heat exchangers installed to condense ammonia from the reactor effluent stream preferably include a heat exchanger for preheating the purge gas stream from the synthesis loop against the reactor effluent stream. The step of supplying boiler feed water preferably includes installation of a steam drum for receiving saturated steam and water from the shell side of the reactor, forming a saturated steam stream, and recycling condensate to the shell side of the reactor. The molar ratio of hydrogen to nitrogen in the purge gas feed stream is preferably less than 2.2. The isothermal reactor preferably operates at a tube-side temperature from 315° C. to 435° C. and pressure from 60 to 210 bar.

DETAILED DESCRIPTION OF THE INVENTION

Figure 1:
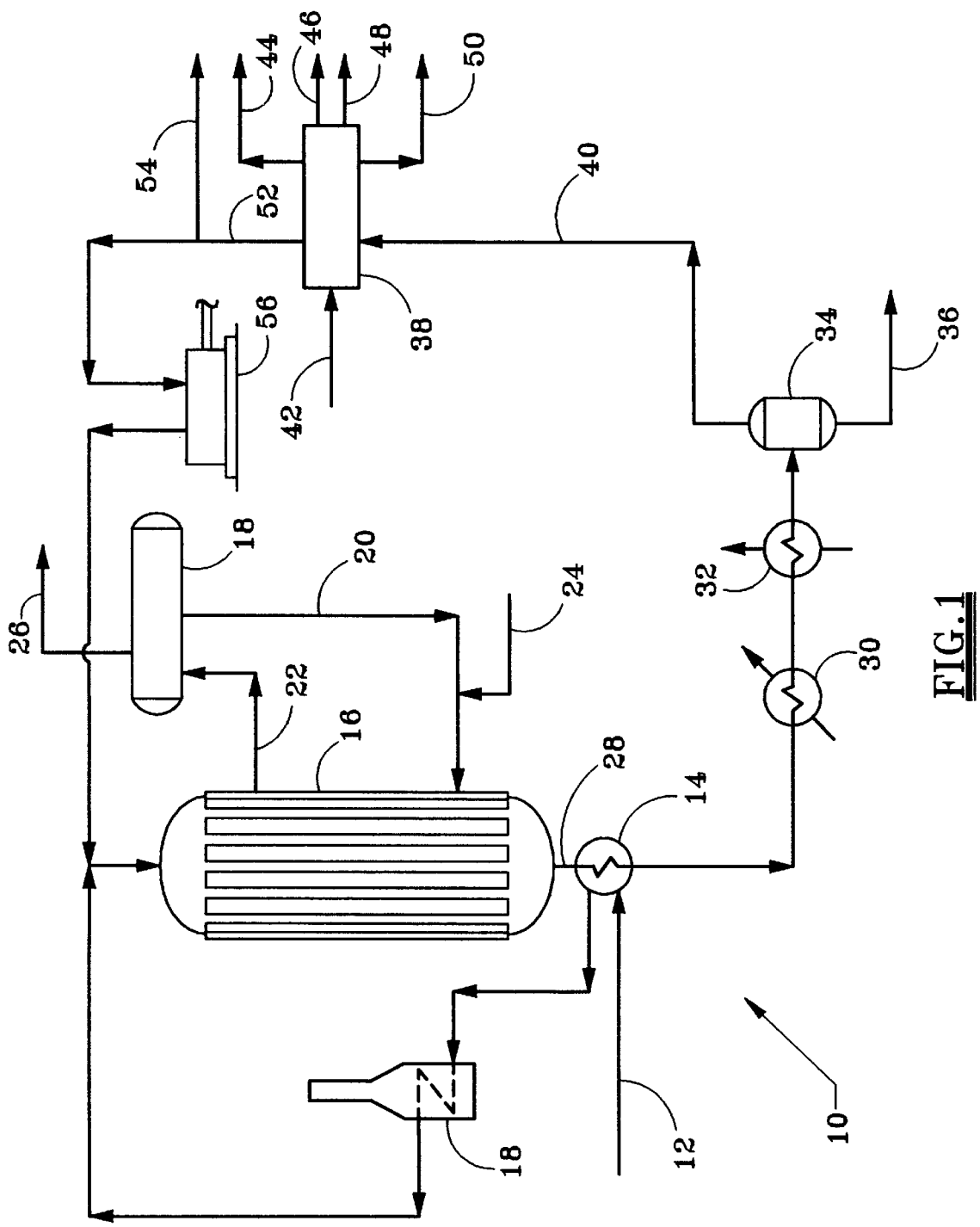
FIG. 1 shows a schematic flow sheet of an isothermal ammonia converter installed according to the present invention.

With reference to FIG. 1, there is shown a process 10 for the once-through isothermal conversion of hydrogen and nitrogen in a purge gas stream to additional ammonia. The purge gas in stream 12 is preheated in feed/effluent exchanger 14 for feed to the tube side of a reactor 16. A fired heater 17 can be used for additional heating of the purge gas feed stream and/or for startup. The tubes in the reactor 16 are filled with catalyst, and the reactor 16 is kept essentially isothermal by boiling water on the shell side of the reactor. A steam drum 18 is provided to maintain the reactor 16 in a flooded condition. Condensate is circulated to the shell side of the reactor 16 via line 20, and steam and condensate are returned to the steam drum 18 via line 22. Make-up boiler feed water is supplied via line 24. The pressure for steam generation in the reactor 16 is desirably selected to be consistent with the maximum pressure of the boiler feed water available, to minimize the temperature difference between the tube and shell sides of the reactor 16. As the purge gas passes through the catalyst in the tubes of the reactor 16, the ammonia concentration is increased from a low inlet concentration, typically from 1 to 10 percent ammonia, to an outlet concentration of at least about 20 percent ammonia, to as high as about 40 percent or more. The ammonia product is recovered by cooling reactor effluent stream 28 in the feed/effluent exchanger 14, with cooling water in exchanger 30, and then with ammonia refrigerant in the exchanger 32. Condensed ammonia is recovered from separator 34 via line 36. Remaining purge gas separated from the ammonia product is sent to optional hydrogen recovery unit 38 via line 40. The hydrogen recovery unit 38 is operated conventionally and can also receive additional purge gases, such as, for example, compressed medium pressure flash gases from the ammonia recovery of the main synthesis loop, via line 42. The hydrogen recovery unit 38 typically produces hydrogen stream 44, argon stream 46, fuel gas stream 48, ammonia stream 50 and nitrogen stream 52. A portion of the nitrogen stream 52 can be recycled to the suction of the synthesis gas compressor (not shown) via line 54, and the remaining portion is optionally recycled to the reactor 16 by compression in nitrogen compressor 56. Recycling the nitrogen to the reactor 16 results in a relatively low H/N ratio, preferably less than 2.2, more preferably about 1.7–1.9, which allows a significant reduction in catalyst volume in reactor 16.

Figure 2:
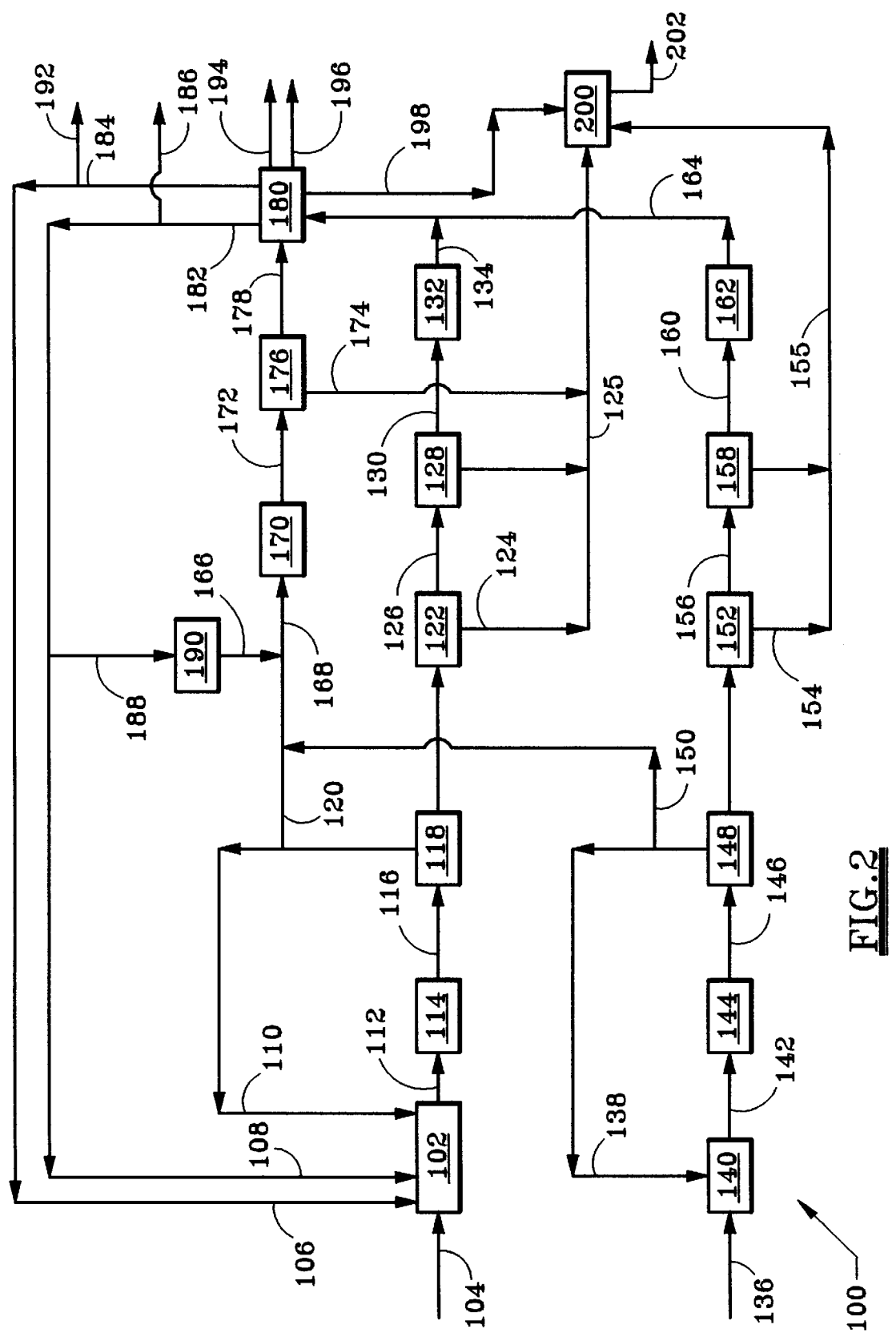
FIG. 2 shows a process flow diagram of an ammonia plant synthesis loop and purge loop in which the purge gas from two synthesis loops is converted to additional ammonia in an isothermal ammonia converter installed according to the principles of one embodiment of the present invention.

With reference to FIG. 2, there is shown a schematic process diagram for a two-train ammonia plant retrofitted by installing the once-through ammonia converter of the present invention to convert hydrogen and nitrogen in the combined purge streams from the two trains into additional ammonia. The process 100 includes a compression step 102 in which makeup gas 104, recycle hydrogen 106, recycle nitrogen 108 and recycle syngas 110 are compressed to form a feed 112 for conversion step 114 employing a conventional compressor and magnetite catalyst converters. Effluent 116 from the conversion step 114 is cooled and passed through a separator in a high pressure separation step 118. A purge stream 120 is taken from the vapor phase from the high pressure separation step 118, and the remainder is recycled to the compression step 102 as the recycle syngas 110 as described above. Liquid from the high pressure separation step 118 is processed in a low pressure separation step 122 to form liquid ammonia 124 and vapor 126 which is processed in ammonia scrubbing step 128. Vapor 130 essentially free of ammonia is compressed in compression step 132 to produce vapor 134 at a suitable pressure for hydrogen recovery.

Similarly, in a second train, makeup gas 136 and syngas recycle 138 are compressed in compression step 140 to form a feed 142 to a magnetite conversion step 144. Effluent 146 from the magnetite conversion step 144 is cooled and separated in high pressure separation step 148, a purge stream 150 is taken off from the vapor from the high pressure separation step 148, and the remainder recycled as recycle syngas 138 to the compression step 140. Liquid from the high pressure separation step 148 is processed in low pressure separation step 152 to obtain liquid ammonia 154 and an ammonia-lean vapor 156 for feed to ammonia scrubbing step 158 to form an essentially ammonia-free vapor 160. Vapor 160 is compressed in compression step 162 to form a vapor 164 at a suitable pressure for hydrogen recovery.

Recycled nitrogen 166 is added to purge gas 120 and purge gas 150 to form feed 168 to a supplemental ammonia conversion step 170. The supplemental ammonia conversion step 170 includes passing the feed 168 through an isothermal ammonia converter installed according to the present invention, and obtains an effluent 172 containing additional ammonia. The effluent 172 is cooled and ammonia 174 separated therefrom in separation step 176. Vapor 178 from the separation step 176 is fed to hydrogen recovery unit 180 which also receives vapor 134 and vapor 164 from the respective compression steps 132 and 162. The hydrogen recovery step includes cryogenic processing or membrane-based recovery to obtain a nitrogen-rich stream 182 and a hydrogen-rich stream 184. An optional nitrogen-rich product 186 can be taken off from the stream 182, and another portion 188 is preferably supplied to compression step 190 to produce the nitrogen recycle 166 as describe above. The remaining nitrogen 108 is supplied to the compression step 102 as described above. A helium purge 192 may be taken off from the hydrogen-rich stream 184 and remaining hydrogen 106 is recycled to the compression step 102 as described above. The hydrogen recovery step 180 can also produce a conventional argon-rich stream 194 and a fuel gas stream 196. Any ammonia 198 obtained from the hydrogen recovery step 180 is supplied to an ammonia storage step 200 with ammonia 125, 155 and 174. An ammonia product 202 is obtained from the ammonia storage 200.

The principles of the invention are illustrated by way of the following example:

EXAMPLE

With reference to FIG. 2, an existing two-train ammonia process was modeled using an ASPEN process simulator. The model was subsequently altered to include a supplemental ammonia conversion step 170 to study a simulation of a retrofit to the existing plant. It was presumed that such a retrofit would reduce the purge rate; reduce energy costs; and increase ammonia production; and by study and calculation, the presumption was confirmed. In the following example, pressures are approximate and pressure drops are mostly ignored.

The supplemental ammonia conversion step 170 that was simulated is based on tubular reactor 16 having vertical tubes as shown in FIG. 1. In the simulation, feed 168 is preheated to 360° C. in a feed/effluent heat exchanger. On start-up, a fired heater provides the required preheat. Feed 168 (FIG. 2) is fed to the top of the reactor 16 (FIG. 1) and flows downward through reactor tubes filled with a ruthenium-impregnated catalyst.

Since the conversion of nitrogen and hydrogen to ammonia is a highly exothermic reaction, the tubular reactor 16 is designed to absorb the heat generated. Further, it is desirable to maintain the reaction at a constant temperature. Isothermal conditions are closely approximated by maintaining the shell side in a flooded condition with pressurized water at its boiling point. Referring again to FIG. 1, a steam drum 18 is provided in an elevated position relative to the reactor 16 to maintain the reactor 16 in the flooded condition. The heat of the reaction is absorbed by the water and converted to steam for energy efficiency.

By conducting a catalyst optimization study, the preferred volume of catalyst in the tubular reactor was determined to be 2.35 m$^3$. The required catalyst volume is relatively constant when the concentration of ammonia in the outlet ranges between 20 and 30 mole percent. In this simulation, the concentration in the reactor effluent 172 was 21.94%. The catalyst volume is further optimized by recycling nitrogen directly to the supplemental ammonia conversion step 170. The required catalyst volume is minimized when recycled nitrogen 166 flow is controlled to maintain a hydrogen/nitrogen ratio of 1.82 in feed 168.

The reactor 16 was sized to accommodate 2.35 m$^3$ of catalyst and to transfer the heat of the reaction, which was 8,714.3 MJ/hr, to pressurized water boiling on the shell side. The pressure for steam generation was chosen to be consistent with the maximum pressure at which boiler feed water was available from the existing plant. By operating the shell side at this practical maximum pressure, the temperature difference between the tube and shell sides of the reactor is minimized. Typically, the shell side would be operated at a pressure between 60 and 150 bar.

The reactor 16 for supplemental ammonia conversion step 170 was modeled as a shell and tube exchanger similar to TEMA type BEM with fixed tube sheets and low chrome tubes with INCONEL safe-ends on both ends. The shell was carbon steel, and the channels and tube sheets were low chrome overlayed with stainless steel. The design pressure for the tubes having a minimum wall thickness of 11.43 mm was 203.9 kg/cm$^2$. By simulation it was determined that a reactor 16 having 179 tubes of 102 mm in diameter and about 3 m long would accommodate the preferred catalyst volume and provide sufficient area for heat transfer.

It was determined that the shell extending the length of the tubes would contain an adequate amount of pressurized boiler feed water to absorb the heat of reaction of the simulated ammonia production rate. For boiler feed water at this pressure, the design pressure of the shell is 140.6 kg/cm$^2$. The pressure drop through the catalyst is 0.5 kg/cm$^2$. Typically, the feed and product gases in the reactor 16 are maintained in a temperature range between 315° C. to 435° C. and in a pressure range between 60 to 210 bar. In this simulation, the feed entered the reactor 16 at 360° C. and exited at 404° C. and 180 bar.

Reactor effluent 172 is cooled to 71° C. in a feed/effluent exchanger; to 38° C. by cooling water; and to 5° C. by ammonia refrigerant, and then directed to separation step 176, where 79 metric tons/day (mtpd) of ammonia 174 are recovered at 98.6% purity.

According to the principles developed in this simulation, an ammonia plant retrofitted with reactor 16 will have lower purge rates, lower energy costs and higher ammonia production rates. The key advantage of reactor 16 is that it operates on a once-through basis, eliminating the need for multiple reactors with interstage cooling. This is possible because the vertical tube reactor is operated essentially isothermally by boiling pressurized water on the shell side.

The results of the ASPEN simulation are summarized in Table 1. The stream numbers correspond to FIG. 2 and the detailed description of the invention.

TABLE 1

| Stream | 104 | 106 | 108 | 110 | 112 | 116 | 120 |
|---|---|---|---|---|---|---|---|
| Components (mole percent) | | | | | | | |
| $H_2$ | 73.80 | 82.27 | 0.26 | 62.27 | 65.11 | 54.60 | 62.27 |
| $N_2$ | 24.86 | 13.01 | 99.74 | 18.74 | 20.13 | 16.43 | 18.74 |
| $CH_4$ | 1.04 | 0.57 | — | 9.69 | 7.59 | 8.53 | 9.69 |
| Ar | 0.28 | 0.75 | — | 3.20 | 2.50 | 2.81 | 3.20 |
| $NH_3$ | — | — | — | 3.89 | 2.94 | 15.69 | 3.89 |
| He | 0.02 | 3.40 | — | 2.21 | 1.72 | 1.94 | 2.21 |
| Total Flow (kg/hour) | 64030 | 2338 | 700 | 245480 | 312540 | 312540 | 6706 |
| Temp (° C.) | 100 | 9 | 23 | −1 | 14 | 406 | −1 |
| Press (kg/cm2) | 227.0 | 227.0 | 3.4 | 227.0 | 227.0 | 227.0 | 227.0 |

| Stream | 125 | 134 | 136 | 138 | 142 | 146 | 150 |
|---|---|---|---|---|---|---|---|
| Components (mole percent) | | | | | | | |
| $H_2$ | 0.04 | 52.26 | 74.27 | 62.07 | 65.31 | 53.22 | 62.07 |
| $N_2$ | 0.02 | 17.57 | 24.76 | 20.60 | 21.71 | 17.67 | 20.60 |
| $CH_4$ | 0.07 | 25.34 | 0.68 | 10.79 | 8.12 | 9.28 | 10.79 |
| Ar | — | 4.12 | 0.26 | 4.38 | 3.28 | 3.75 | 4.38 |
| $NH_3$ | 99.87 | — | — | 1.70 | 1.24 | 15.69 | 1.70 |
| He | — | 0.71 | 0.03 | 0.46 | 0.34 | 0.39 | 0.46 |
| Total Flow (kg/hour) | 59834 | 538 | 64815 | 225030 | 289840 | 289840 | 4343 |
| Temp (° C.) | 1 | 180 | 100 | −25 | 5 | 370 | −25 |
| Press (kg/cm2) | 19.1 | 71.4 | 199.0 | 199.0 | 199.0 | 119.0 | 199.0 |

| Stream | 155 | 164 | 166 | 168 | 172 | 174 | 178 | 186 |
|---|---|---|---|---|---|---|---|---|
| Components (mole percent) | | | | | | | | |
| $H_2$ | 0.03 | 50.05 | 0.26 | 54.23 | 36.25 | 0.46 | 44.06 | 0.26 |
| $N_2$ | 0.01 | 18.96 | 99.74 | 29.77 | 25.98 | 0.39 | 31.55 | 99.74 |
| $CH_4$ | 0.04 | 24.76 | — | 8.81 | 10.45 | 0.48 | 12.63 | — |
| Ar | 0.01 | 6.09 | — | 3.17 | 3.77 | 0.07 | 4.58 | — |
| $NH_3$ | 99.91 | — | — | 2.67 | 21.94 | 98.60 | 5.23 | — |
| He | — | 0.12 | — | 1.35 | 1.60 | — | 1.95 | — |
| Total Flow (kg/hour) | 60146 | 327 | 4398 | 15447 | 15447 | 3138 | 12309 | 258 |
| Temp (° C.) | −24 | 143 | 60 | −2 | 380 | 5 | 5 | 23 |
| press (kg/cm2) | 19.1 | 71.4 | 184.0 | 184.0 | 183.5 | 182.5 | 182.5 | 3.4 |

| Stream | 188 | 194 | 196 | 198 | 202 |
|---|---|---|---|---|---|
| Components (mole percent) | | | | | |
| $H_2$ | 0.26 | — | 7.24 | — | 0.05 |
| $N_2$ | 99.74 | — | 15.85 | — | 0.02 |
| $CH_4$ | — | — | 74.88 | — | 0.07 |
| Ar | — | 100.00 | 1.60 | — | 0.01 |
| $NH_3$ | — | — | 0.17 | 100.00 | 99.85 |
| He | — | — | 0.26 | — | — |

TABLE 1-continued

| | | | | | |
|---|---|---|---|---|---|
| Total Flow (kg/hour) | 4398 | 1436 | 2819 | 748 | 123870 |
| Temp (° C.) | 23 | −100 | 9 | 30 | −11 |
| Press (kg/cm2) | 3.4 | 3.41 | 3.4 | 16.0 | 16.0 |

The present invention is illustrated by way of the foregoing description and example. Various modifications will be apparent to those skilled in the art in view thereof. It is intended that all such variations within the scope and spirit of the appended claims be embraced thereby.

What is claimed is:

1. A method for converting ammonia synthesis loop purge gas containing ammonia, nitrogen and hydrogen to form additional ammonia comprising:

(a) supplying the synthesis loop purge gas to an inlet of an ammonia converter comprising a shell and tube reactor having upright tubes containing an ammonia synthesis catalyst and passing the purge gas through the tubes to convert the nitrogen and hydrogen and form a product gas having an increased ammonia content relative to the purge gas;

(b) supplying boiling water to a shell-side of the reactor to provide cooling and maintain a substantially isothermal shell-side condition; and (c) recovering the ammonia from the product gas to form an ammonia-lean stream.

2. The method of claim 1, wherein the catalyst comprises a platinum group metal supported on graphite.

3. The method of claim 2, wherein the platinum group metal is ruthenium.

4. The method of claim 8 wherein the feed and product gases are maintained at a temperature in the range from 315° C. and 435° C. and at a reaction pressure from 60 to 210 bar.

5. The converter of claim 4, wherein the pressure of the shell-side boiling water is from 60 to 150 bar.

6. The method of claim 5, wherein the purge gas has an ammonia content of less than 3 mole percent and the product gas has an ammonia content from about 15 to about 40 mole percent.

7. The method of claim 1 wherein the converter is operated on a once-through purge gas basis.

8. The method of claim 1, comprising the step of preheating the synthesis loop purge gas in heat exchange with the product gas.

9. The method of claim 8, wherein the ammonia recovery step comprises cooling the product gas to condense ammonia and separating the ammonia condensate from the ammonia-lean stream.

10. The method of claim 9, further comprising the steps of:

(d) supplying the ammonia-lean stream to a hydrogen recovery unit to form a nitrogen-rich stream and a hydrogen-rich stream;

(e) compressing a portion of the nitrogen-rich stream and recycling the compressed nitrogen-rich stream into the preheated synthesis loop purge gas;

(f) recycling the hydrogen-rich stream to the synthesis loop.

11. A method for retrofitting an ammonia plant having (1) a synthesis loop wherein fresh ammonia synthesis gas containing hydrogen and nitrogen is combined with first and second recycle streams to form a combined ammonia synthesis gas, the combined ammonia synthesis gas is reacted over ammonia synthesis catalyst to form a converted gas, and a purge gas stream and ammonia are removed from the converted gas to form the first recycle stream, and (2) a purge gas loop wherein the purge gas stream is processed in a hydrogen recovery unit to form a nitrogen-rich stream and a hydrogen-rich stream which is supplied to the synthesis loop as the second recycle stream, comprising the steps of:

(a) installing a shell and tube reactor having upright tubes containing ammonia synthesis catalyst for once-through conversion of nitrogen and hydrogen in a purge gas feed stream, including the purge gas stream from the synthesis loop, into additional ammonia in a reactor effluent stream;

(b) supplying boiler feed water to a shell-side of the reactor to remove heat from the tubes and maintain a substantially isothermal condition on the shell-side;

(c) installing heat exchangers and a vapor-liquid separator for condensing and recovering ammonia from the reactor effluent stream and forming an ammonia-lean stream;

(d) passing the ammonia-lean stream to the hydrogen recovery unit.

12. The method of claim 11, further comprising the step of installing a compressor for combining a portion of the nitrogen-rich stream from the hydrogen recovery unit with the purge gas stream from the synthesis loop to form the purge gas feed stream.

13. The method of claim 12, wherein the heat exchangers installed to condense ammonia from the reactor effluent stream include a heat exchanger for preheating the purge gas stream from the synthesis loop against the reactor effluent stream.

14. The method of claim 11, wherein the boiler feed water supply step includes installation of a steam drum for receiving saturated steam and water from the shell-side of the reactor, forming a saturated steam stream, and recycling condensate to the shell-side of the reactor.

15. The method of claim 12, wherein the molar ratio of hydrogen to nitrogen in the purge gas feed stream is less than 2.2.

16. The method of claim 11, wherein the reactor operates at a tube-side temperature from 315° C. to 435° C. and pressure from 60 to 210 bar.

* * * * *